UNITED STATES PATENT OFFICE.

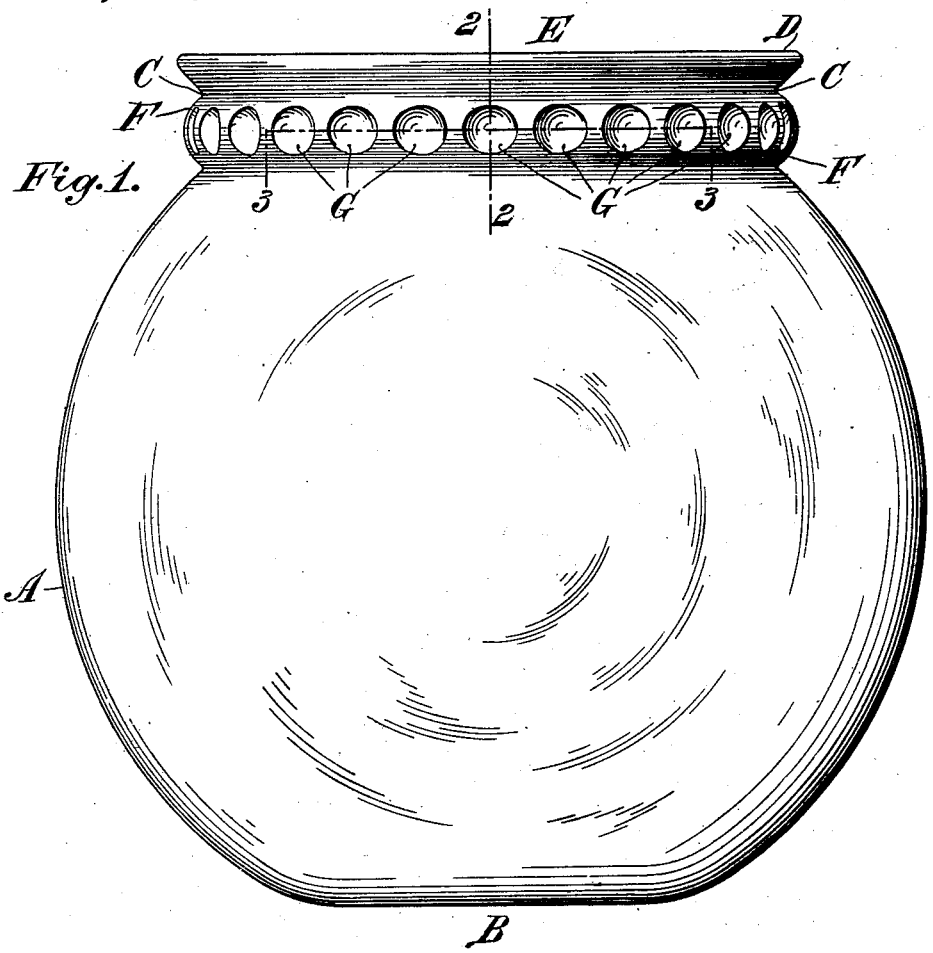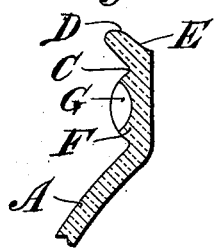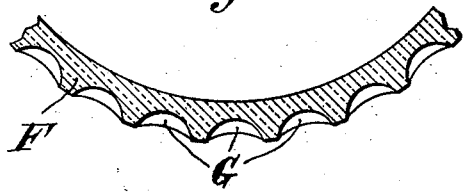

KRAFT BOOTH, OF PHILADELPHIA, PENNSYLVANIA, ASSIGNOR TO GILLINDER AND SONS, INC., OF PHILADELPHIA, PENNSYLVANIA.

FISH-BOWL.

No. 925,861.　　　　Specification of Letters Patent.　　　Patented June 22, 1909.

Application filed November 13, 1908. Serial No. 462,408.

*To all whom it may concern:*

Be it known that I, KRAFT BOOTH, a citizen of the United States, residing at Philadelphia, in the county of Philadelphia and State of Pennsylvania, have invented a certain new and useful Improvement in Fish-Bowls; and I do hereby declare the following to be a full, clear, and exact description of the invention, such as will enable others skilled in the art to which it appertains to make and use the same.

My invention relates to fish bowls made wholly of clear glass and my object is to produce a bowl of this character in which fish or other objects floating therein will appear refracted to a person looking through the side of the bowl.

The invention consists of an integral, clear glass bowl provided with a refracting band or zone, as will be herein fully described with the aid of the accompanying drawings and pointed out in the claim at the conclusion of said description.

In said drawings Figure 1 is a view in side elevation of my improved fish bowl. Fig. 2 is a vertical sectional view of a portion of said bowl on the line 2—2 of Fig. 1. Fig. 3 is a horizontal sectional view of a portion of the bowl on the line 3—3 of Fig. 1.

The bowl to which my improvement is applicable may consist of the usual globular body A, base B, neck C and rim D forming the mouth E.

Located on the neck C, or between the globular body A and the rim D, is what I have termed a "refracting" band or zone F. This refracting band is integral with the bowl and may be made by pressing or cutting. It may be of any desired width and by preference entirely encircles the bowl. The refractive or illusive effect is produced by forming the band either with depressions, with projections, or with both depressions and projections, which constitute lenses or prisms for refracting objects viewed through them. Said depressions and projections may be of any suitable design and arranged in any suitable manner. The configuration of the refracting band or of its lenses or prisms may be such as to apparently multiply the fish in the bowl when looked at through the band. Or the configuration may be such as to produce a distorted appearance of the fish, while still other configurations may cause the fish to appear cut up or divided.

The band illustrated in the drawings is convex on its exterior surface and has formed in it a series of rounded depressions G, each such depression being in effect a concave lens through which each object in the bowl is seen greatly reduced in size. Since there are a number of lenses, the object or objects in the bowl will appear to be multiplied when looked at through the refracting band, the degree of multiplication depending upon the number of depressions or lenses that come within the direct range of vision.

By changing the form of the lenses different illusory effects may be produced as before explained.

It will be observed that by locating the refracting band on the neck C, as indicated, the fish or other objects in the bowl may be viewed as usual by looking through the globular body, the general effect of which is to magnify said objects in appearance. When, however, said objects are viewed through the refracting band, the objects appear to be multiplied, distorted or divided according to the character of the band. Thus, as the eye travels between the body of the bowl and the band, very pleasing illusory effects are produced.

I claim as my invention:—

An integral fish bowl of clear glass comprising a globular body, a base, a neck, an open mouth, and a refracting band for producing optical illusions, said refracting band being located on said neck.

In testimony whereof I affix my signature in presence of two witnesses.

KRAFT BOOTH.

Witnesses:
　HOWARD S. BEATTY,
　F. R. GILLINDER.